United States Patent
Ludvik et al.

(10) Patent No.: US 10,429,107 B2
(45) Date of Patent: Oct. 1, 2019

(54) SIMPLIFIED RECUPERATING ELECTRIC ECS

(71) Applicant: HONEYWELL INTERNATIONAL INC., Morris Plains, NJ (US)

(72) Inventors: Jan Ludvik, Jesenice (CZ); Martin Knob, Prague (CZ); Michael John Street, Weymouth (GB)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 176 days.

(21) Appl. No.: 15/404,645

(22) Filed: Jan. 12, 2017

(65) Prior Publication Data

US 2018/0194481 A1    Jul. 12, 2018

(51) Int. Cl.
| | | |
|---|---|---|
| *F25B 41/04* | (2006.01) | |
| *F25B 9/00* | (2006.01) | |
| *F25B 9/06* | (2006.01) | |
| *B64D 13/06* | (2006.01) | |

(52) U.S. Cl.
CPC ............. *F25B 41/04* (2013.01); *B64D 13/06* (2013.01); *F25B 9/004* (2013.01); *F25B 9/06* (2013.01); *B64D 2013/0644* (2013.01); *B64D 2013/0648* (2013.01); *B64D 2013/0688* (2013.01); *Y02T 50/56* (2013.01)

(58) Field of Classification Search
CPC ................... B64D 13/08; B64D 13/02; B64D 2013/0618; F25B 9/004; F25B 41/04; F25B 9/06; Y02T 50/56

USPC ........................................................ 62/402
See application file for complete search history.

(56) References Cited

U.S. PATENT DOCUMENTS

| | | | | |
|---|---|---|---|---|
| 4,963,174 A | * | 10/1990 | Payne | B64D 13/06 62/172 |
| 5,461,882 A | * | 10/1995 | Zywiak | B60H 1/00007 62/401 |
| 5,887,445 A | * | 3/1999 | Murry | B64D 13/06 62/402 |
| 5,911,388 A | | 6/1999 | Severson et al. | |
| 5,918,472 A | * | 7/1999 | Jonqueres | B64D 13/06 62/172 |
| 6,041,615 A | | 3/2000 | Ostersetzer et al. | |
| 6,070,418 A | * | 6/2000 | Crabtree | B64D 13/06 62/172 |
| 6,199,387 B1 | * | 3/2001 | Sauterleute | B64D 13/06 62/87 |
| 6,295,822 B1 | | 10/2001 | Mueller | |
| 6,415,595 B1 | * | 7/2002 | Wilmot, Jr. | B64D 13/006 60/266 |
| 6,427,471 B1 | * | 8/2002 | Ando | B64D 13/06 62/402 |
| 8,347,647 B2 | | 1/2013 | McAuliffe et al. | |
| 9,016,075 B1 | | 4/2015 | Johnson | |

(Continued)

*Primary Examiner* — Cassey D Bauer
(74) *Attorney, Agent, or Firm* — Shimokaji IP (57) ABSTRACT

An environmental control system (ECS) includes an air cycle machine (ACM), a condenser downstream of the ACM, a reheater between the condenser and the ACM, a primary heat exchanger upstream of the reheater, a first regulated flow path between the condenser and a first environment outside of the ECS, a second regulated flow path between a second environment to be conditioned and the reheater, and a third regulated flow path between the primary heat exchanger and the reheater.

4 Claims, 9 Drawing Sheets

(56) References Cited

U.S. PATENT DOCUMENTS

2008/0110193 A1    5/2008  Jonqueres
2016/0083100 A1*   3/2016  Bammann .............. B64D 13/06
                                                      62/89

* cited by examiner

SIMPLIFIED RECUPERATING ELECTRIC ECS

BACKGROUND OF THE INVENTION

The present invention generally relates to environmental control systems and, more particularly, to apparatus and methods of recuperating energy in environmental control systems.

Figure 1:
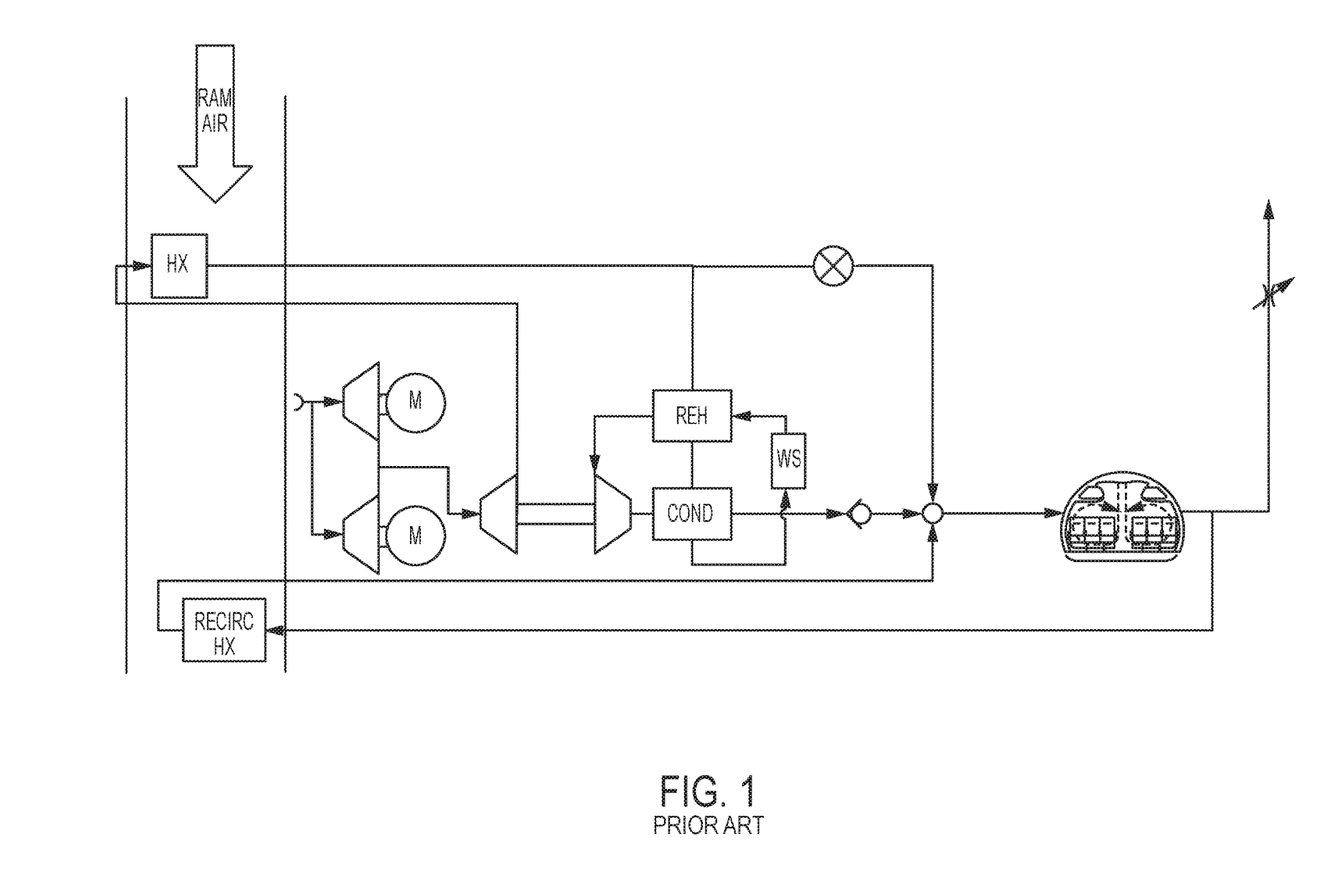
FIG. 1 is a schematic diagram of a prior design of an environmental control system.

Environmental control systems (ECSs) can be designed with a two-wheel air cycle machine (ACM), together with a primary heat exchanger, air compressors, motors to drive the air compressors, a condenser, a water extractor, a reheater, and a recirculating heat exchanger. A prior ECS design is shown in FIG. 1.

An ECS design has to address issues of cost, weight, and complexity. It needs to do so in differing operating contexts. For example, in aircraft, an ECS may need to operate differently on the ground versus in flight in order to achieve operating efficiencies. Efficiencies can potentially be achieved by introducing the energy recuperation of the ECS. They can also be potentially achieved by reduction of system weight, component size, and number of components.

As can be seen, there is a need for improved apparatus and methods to condition air for changing environments.

SUMMARY OF THE INVENTION

In one aspect of the present invention, an environmental control system (ECS) comprises an air cycle machine (ACM); a condenser downstream of the ACM; a reheater between the condenser and the ACM; a primary heat exchanger upstream of the reheater; a first regulated flow path between the condenser and a first environment outside of the ECS; a second regulated flow path between a second environment to be conditioned and the reheater; and a third regulated flow path between the primary heat exchanger and the reheater.

In another aspect of the present invention, an environmental control system (ECS) comprises a motor driven, two-wheel, air cycle machine (ACM); a condenser downstream of the ACM; a reheater downstream of the condenser and upstream of the ACM; a primary heat exchanger upstream of the reheater and downstream of the ACM; a first valve between the condenser and a first environment outside of the ECS; a second valve between a second environment to be conditioned and the reheater; a third valve between the primary heat exchanger and the reheater; and a fourth valve between the primary heat exchanger and the second environment.

In a further aspect of the present invention, an environmental control system (ECS) comprises an air cycle machine (ACM); a condenser downstream of the ACM; a reheater between the condenser and the ACM; a primary heat exchanger upstream of the reheater; a first regulated flow path between the condenser and a first environment outside of the ECS; a second regulated flow path between a second environment to be conditioned and the reheater; a third regulated flow path between the primary heat exchanger and the reheater; an ACM heat exchanger between the reheater and the ACM; and a fourth regulated flow path between the reheater and the ACM.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides an ECS that reduces the total number of system components by eliminating the need for air compressors and their attendant motors that would otherwise compress outside air, such as RAM air in the context of an aircraft. The ECS of the present invention may also increase energy recuperation by expanding a second environmental air in an ACM turbine and thereby using the energy to decrease the motor 205 power demand.

Generally, the ECS of the present invention includes a motorized, two-wheel air cycle machine (ACM), a condenser downstream of the ACM, a water extractor downstream of the condenser, and a reheater downstream of the water extractor and upstream of the ACM. An environment to be conditioned, such as a closed environment like the cabin of an aircraft, receives conditioned air from a mixer, which may receive air from a condenser or directly from a primary heat exchanger. A last branch leads from the recirculation heat exchanger.

As used herein, the term "directly upstream" and "directly downstream" is intended to mean that there is an absence of a third system component between two system components, except for a flow path between the two system components.

Figure 2:
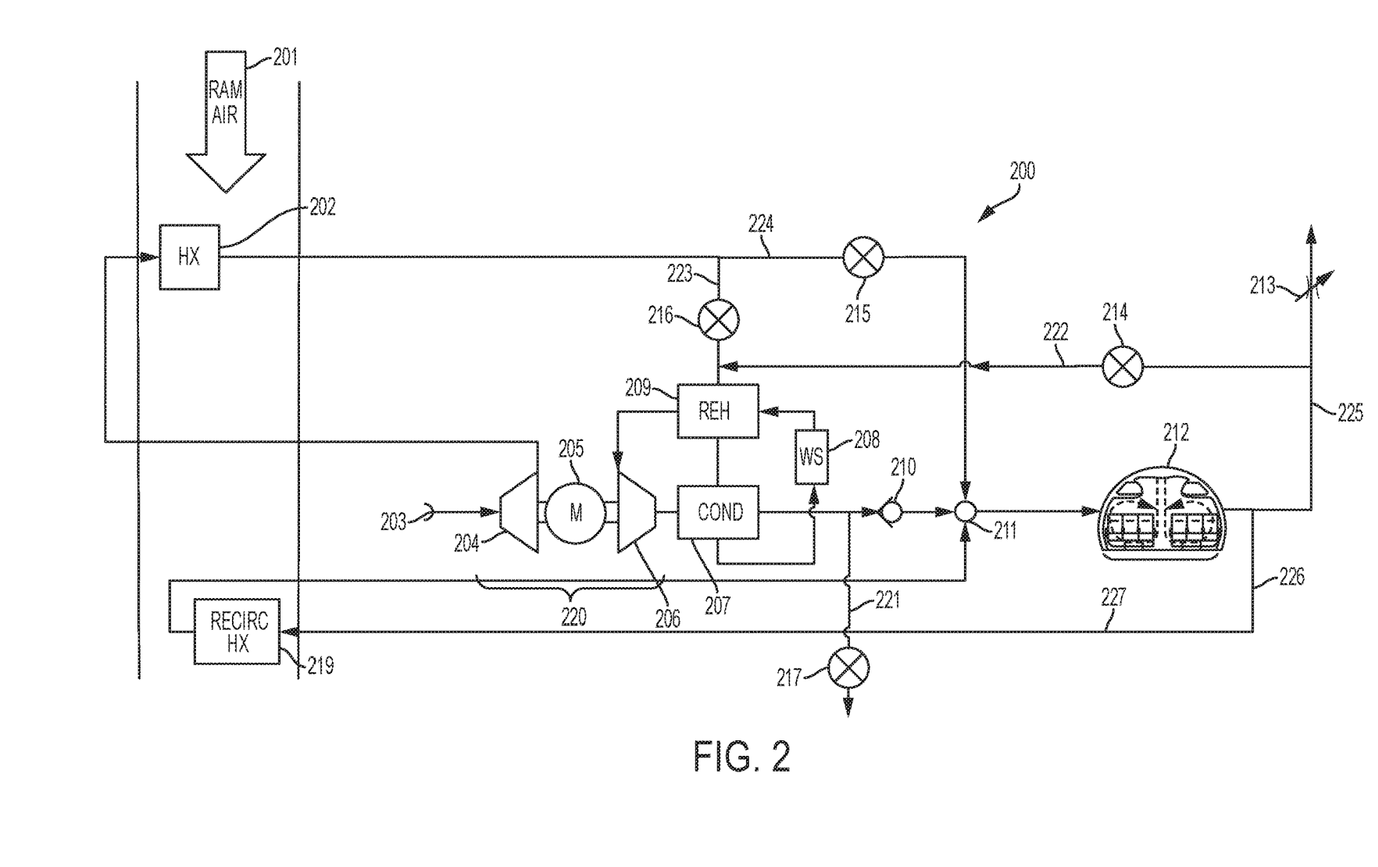
FIG. 2 is a schematic diagram of an environmental control system according to an embodiment of the present invention.

In FIG. 2, an ECS 200 according to an exemplary embodiment is schematically shown. The ECS 200 may receive outside air flow 201, such as RAM air flow in the context of an aircraft. The outside air flow 201 may flow to a primary heat exchanger 202 where the outside air flow 201 is heated. The outside air flow 201 may flow directly for receipt by an air cycle machine (ACM) 220 either through an independent inlet 203 or through the outside air channel branching. As can be seen, the outside air flow 201 can flow directly into the air cycle machine 220 without having to first be compressed by one or more compressors. Thus, the outside air flow 201 can also directly flow into the ACM 220 without one or more motors driving one or more compressors, as in FIG. 1. Accordingly, the ECS 200 can eliminate the need for and can operate in the absence of one or more compressors and/or motors that might otherwise exist upstream of the ACM in prior ECS designs.

In an embodiment, the air cycle machine 220 may be a two-wheel design that includes a compressor 204 on a common shaft with a turbine 206. A motor 205 may drive the shaft and thus the two wheels. The motorized, two-wheel, ACM 220 may, via the compressor 204, compress the outside air 203 and then, via the turbine 206, expand the compressed outside air. A condenser 207 may be directly downstream of the ACM 220 and, in particular, directly downstream of the turbine 206. The condenser 207 may condense the humidity contained in the air before expanding in the turbine 206.

A water extractor 208 may be directly downstream of the condenser 207 to remove water from a humidified air from the condenser 207. A reheater 209 may be directly downstream of the water extractor 208, directly upstream of the ACM 220 (specifically, the turbine 206), and directly upstream of the condenser 207.

Thereby, the reheater can reheat a dehumidified air from the water extractor 208. The ACM 220 (specifically, the turbine 206) may receive a reheated air from the reheater 209. Concurrently, the condenser 207 may receive a cooled air from the reheater 209.

From the condenser 207, a dehumidified air may flow into a first regulated flow path 221 having a first valve 217 therein. The flow path 221 may lead to a first environment outside of the ECS, such as overboard of an aircraft. The first valve 217 may operate in either an open mode, a partially open mode, or a closed mode.

Alternatively to and/or in addition to flowing out to the first environment, the condensed air from the condenser 207 may flow through a non-return valve 210 and then into a mixer 211. From the mixer 211, a supply air may enter a second environment 212 to be conditioned, such as an enclosed environment for occupants like a cabin of an aircraft.

From the second environment 212, an environmental air may exit and flow into either or both a flow path 225 and a flow path 226. If into the flow path 225, the environmental air may flow through an outflow valve 213 and into the first environment. In addition to or alternatively into the outflow valve 213, the environmental air in the flow path 225 may flow into a second regulated flow path 222 having a second valve 214 therein. The second valve 214 may operate in either an open mode or a closed mode.

From the second valve 214, the environmental air may enter the reheater 209. Thus, the second regulated flow path 222 provides a recuperating energy flow path for energy recovery.

The reheater 209 may also receive, via a third regulated flow path 223, a cooled air from the primary heat exchanger 202. The cooled air may be produced by the outside air flow 201 being in heat exchange relationship from air from the ACM 220 (specifically, the compressor 204). A third valve 216 may be in the flow path 223 and may operate in either an open mode or a closed mode.

If the environmental air flows from the flow path 226 and directly into the flow path 227, the environmental air may recirculate through a recirculation heat exchanger 219 which is in heat exchange relationship with the outside air flow 201. From the recirculation heat exchanger 219, a recirculated air may flow into the mixer 211 and then as part of the supply air into the second environment 212.

The mixer 211 may also receive, via a fourth regulated flow path 224, the cooled air from the primary heat exchanger 202. The flow path 224 may have a fourth valve 215 therein and which may operate in either an open mode or a closed mode.

The ECS 200 may operate in different modes depending on different operating conditions in which the ECS may exist. For example, if the ECS 200 is in an aircraft, the aircraft may operate on the ground, in climb, in cruise, and in descent.

Figure 2A:
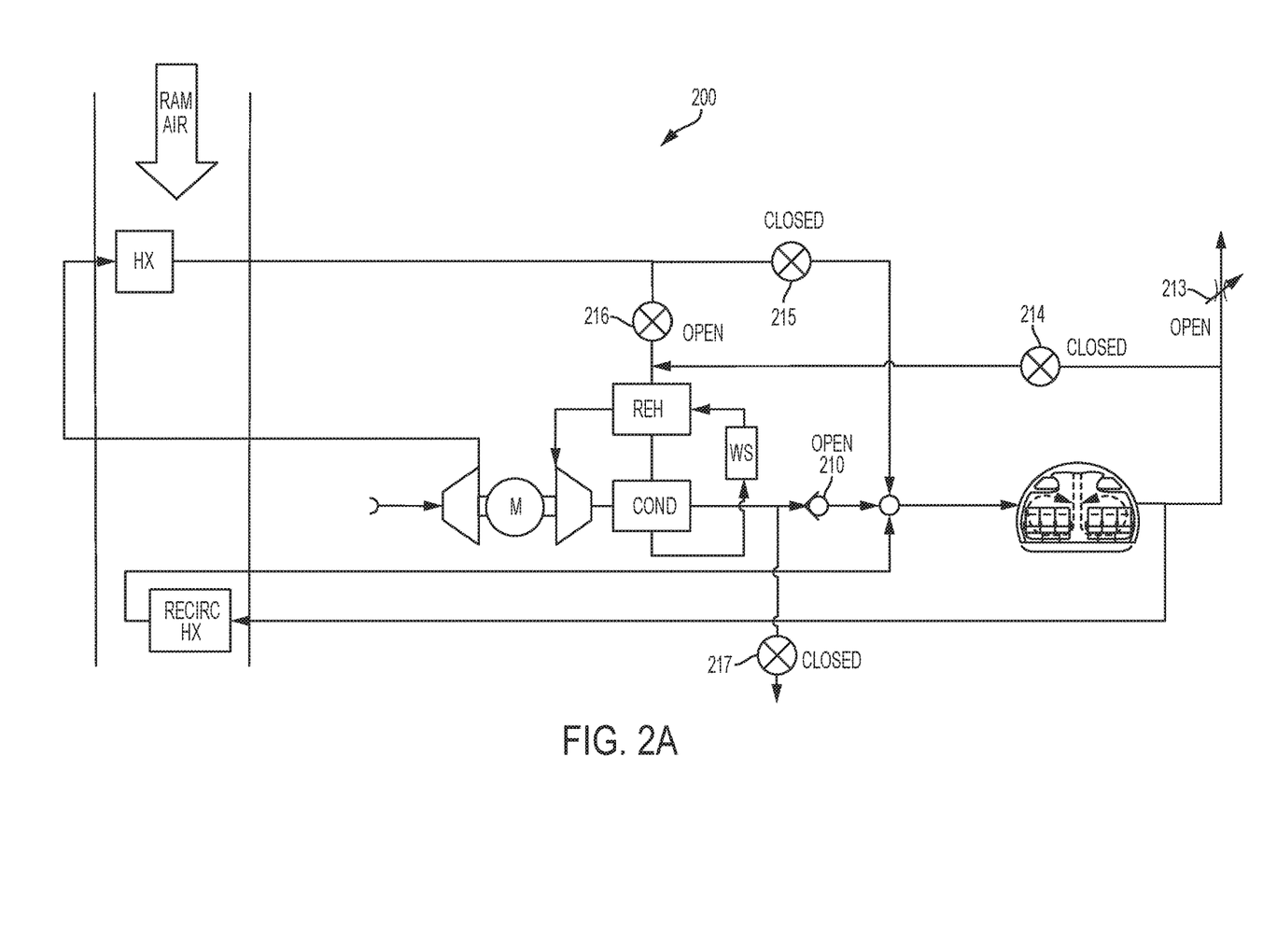
FIG. 2A is a schematic diagram of the environmental control system of FIG. 2 in a first mode of operation.

FIG. 2A depicts an exemplary mode of operation of the ECS 200 when, for example, the ECS 200 is in an aircraft that is operating on the ground, in initial climb or final descent. In an embodiment, the non-return valve 210 may be open, the outflow valve 213 may be open, the first valve 217 may be closed, the second valve 214 may be closed, the third valve 216 may be open, and the fourth valve 215 may be closed.

Figure 2B:
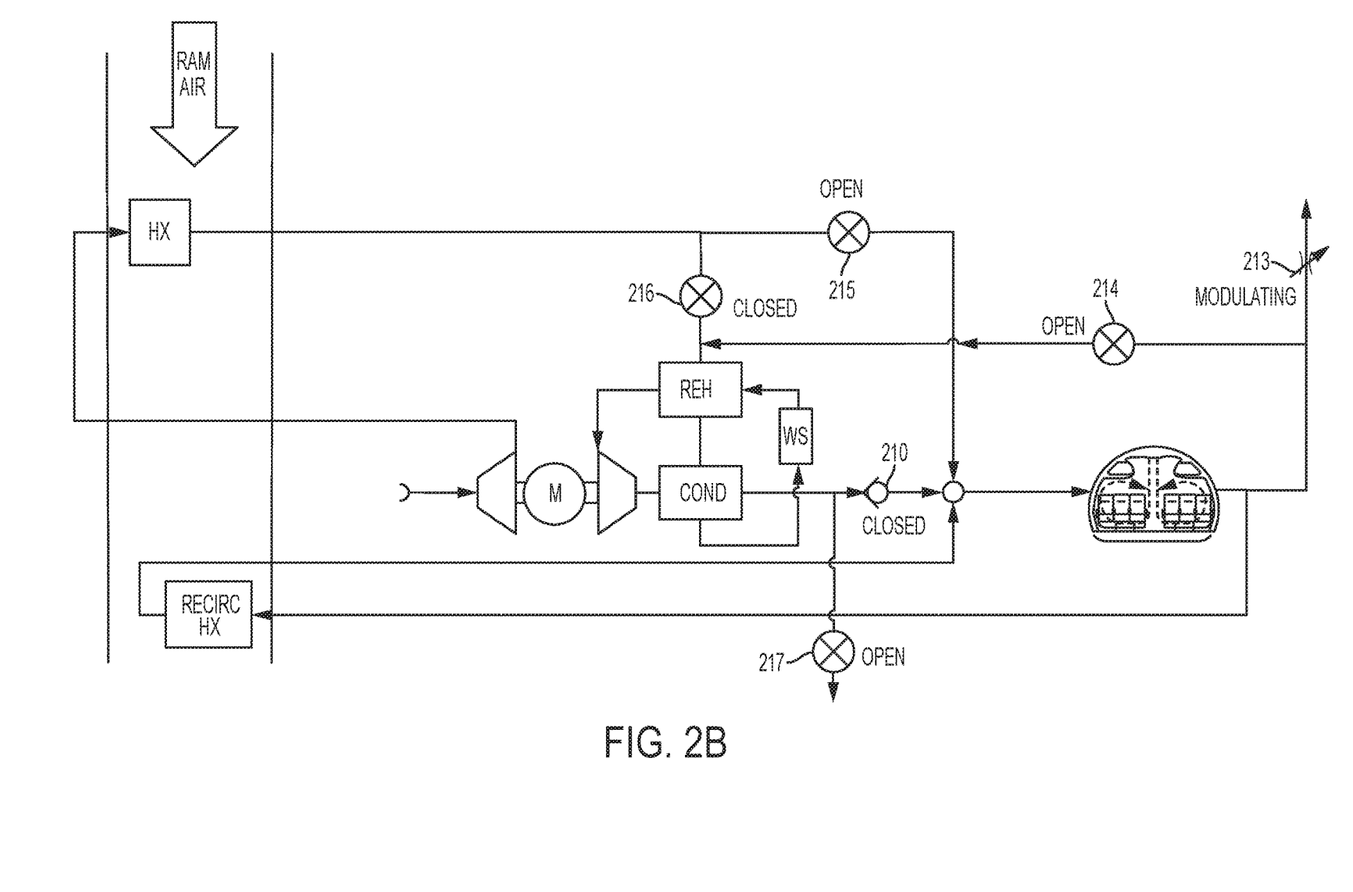
FIG. 2B is a schematic diagram of the environmental control system of FIG. 2 in a second mode of operation.

FIG. 2B depicts an exemplary mode of operation of the ECS 200 when, for example, the ECS 200 is in an aircraft that is operating at a later stage of climb, cruising altitude, or at initial descent. In an embodiment, the non-return valve 210 may be closed, the outflow valve 213 may be modulating, the first valve 217 may be open, the second valve 214 may be open, the third valve 216 may be closed, and the fourth valve 215 may be open.

Figure 3:
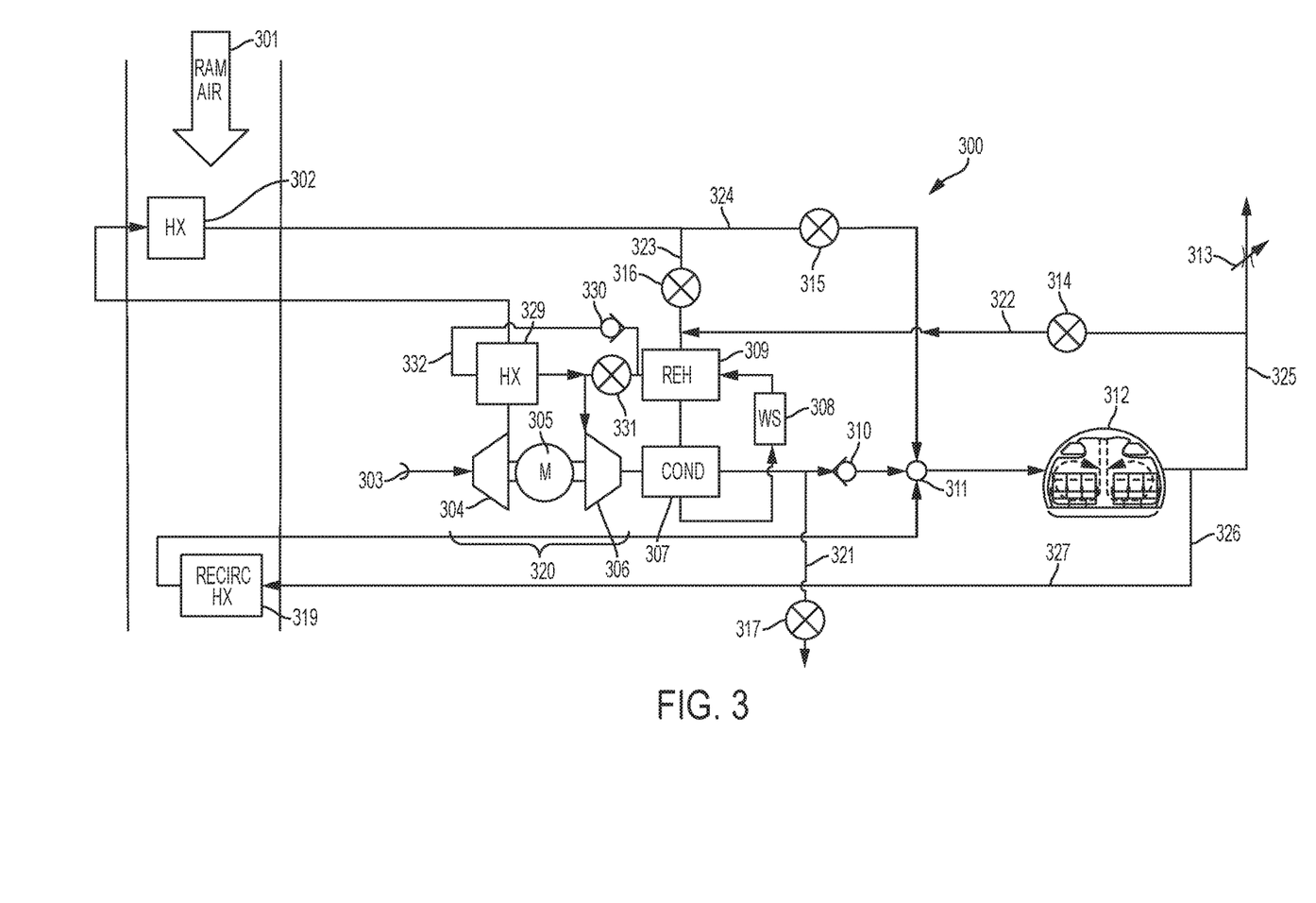
FIG. 3 is a schematic diagram of an environmental control system according to an embodiment of the present invention.

FIG. 3 schematically depicts an ECS 300 according to another exemplary embodiment of the present invention. The embodiment of the ECS 300 can be the same as the embodiment of the ECS 200, except that the former may include an ACM heat exchanger 329, and a regulated flow path 332 between the reheater 309 and the ACM 320.

In the ECS 300, the ACM heat exchanger 329 can be directly downstream of the reheater 309 and directly upstream of the ACM 320 (including directly downstream of the compressor 304 and directly upstream of the turbine 306). The regulated flow path 332 may include a non-return valve 330 directly downstream of the reheater 309 and directly upstream of the ACM heat exchanger 329. The regulated flow path 332 may further include a valve 331 directly downstream of the reheater 309 and directly downstream of the ACM heat exchanger 329.

The ECS 300 may operate in different modes depending on different operating conditions in which the ECS may exist. For example, if the ECS 300 is in an aircraft, the aircraft may operate on the ground, in climb, in cruise, and in descent.

Figure 3A:
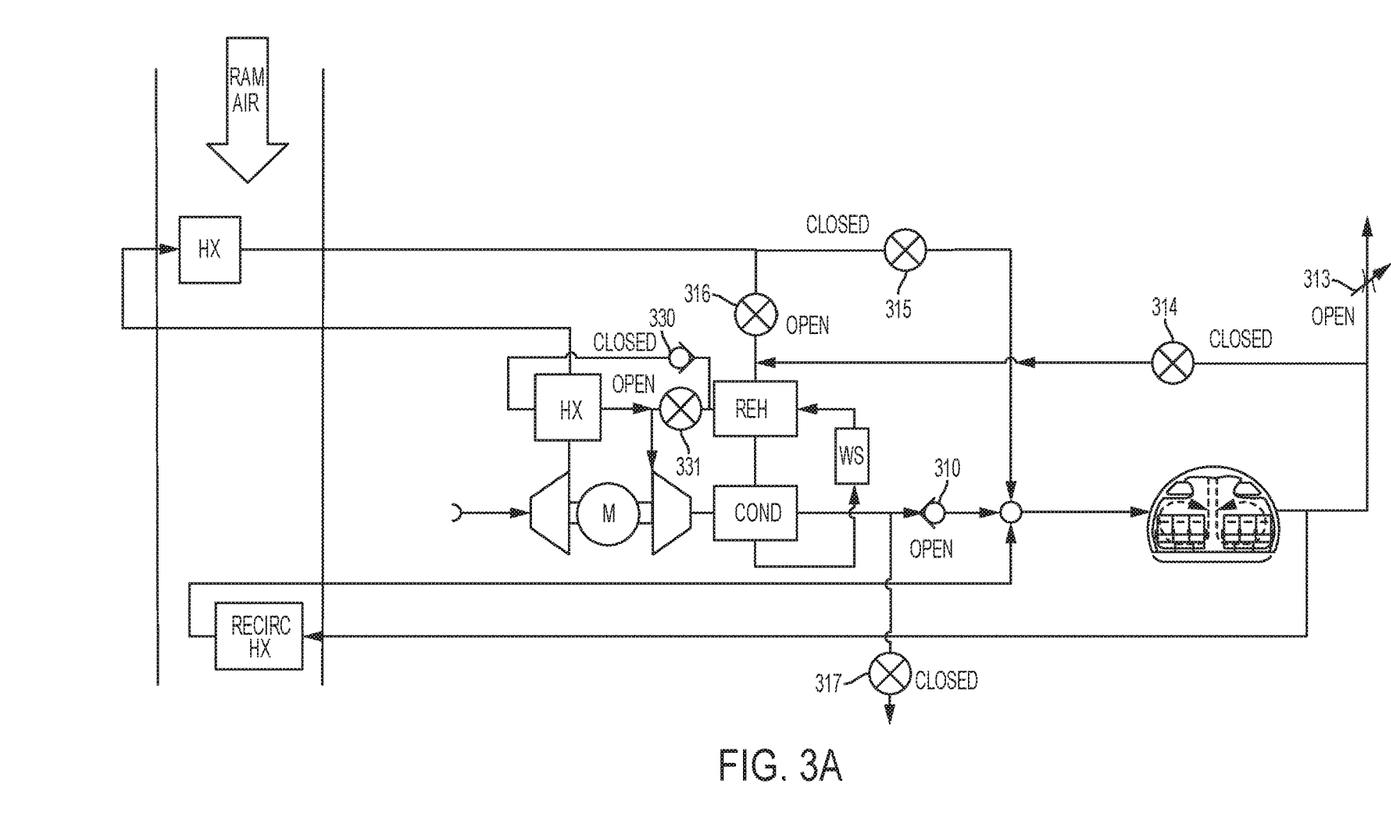
FIG. 3A is a schematic diagram of the environmental control system of FIG. 3 in a first mode of operation.

FIG. 3A depicts an exemplary mode of operation of the ECS 300 when, for example, the ECS 300 is in an aircraft that is operating on the ground, in initial climb, or final descent. In an embodiment, the non-return valve 310 may be open, the outflow valve 313 may be open, the first valve 317 may be closed, the second valve 314 may be closed, the third valve 316 may be open, and the fourth valve 315 may be closed. In addition, the non-return valve 330 may be closed and the valve 331 may be open.

Figure 3B:
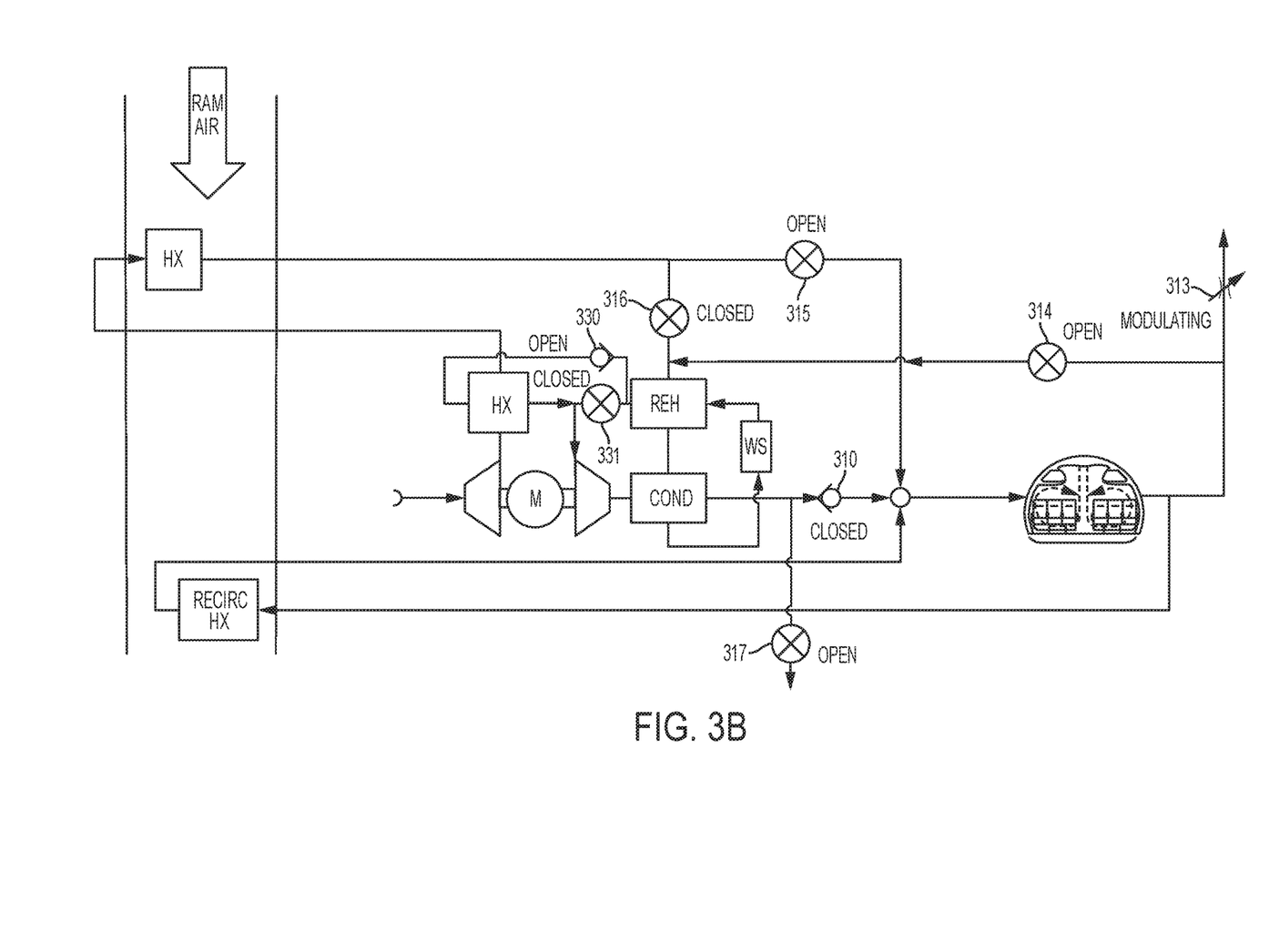
FIG. 3B is a schematic diagram of the environmental control system of FIG. 3 in a second mode of operation.

FIG. 3B depicts an exemplary mode of operation of the ECS 300 when, for example, the ECS 300 is in an aircraft that is operating at a later stage of climb, cruising altitude, or at initial descent. In an embodiment, the non-return valve 310 may be closed, the outflow valve 313 may be modulating, the first valve 317 may be open, the second valve 314 may be open, the third valve 316 may be closed, and the fourth valve 315 may be open. In addition, the non-return valve 330 may be open and the valve 331 may be closed.

Figure 4A:
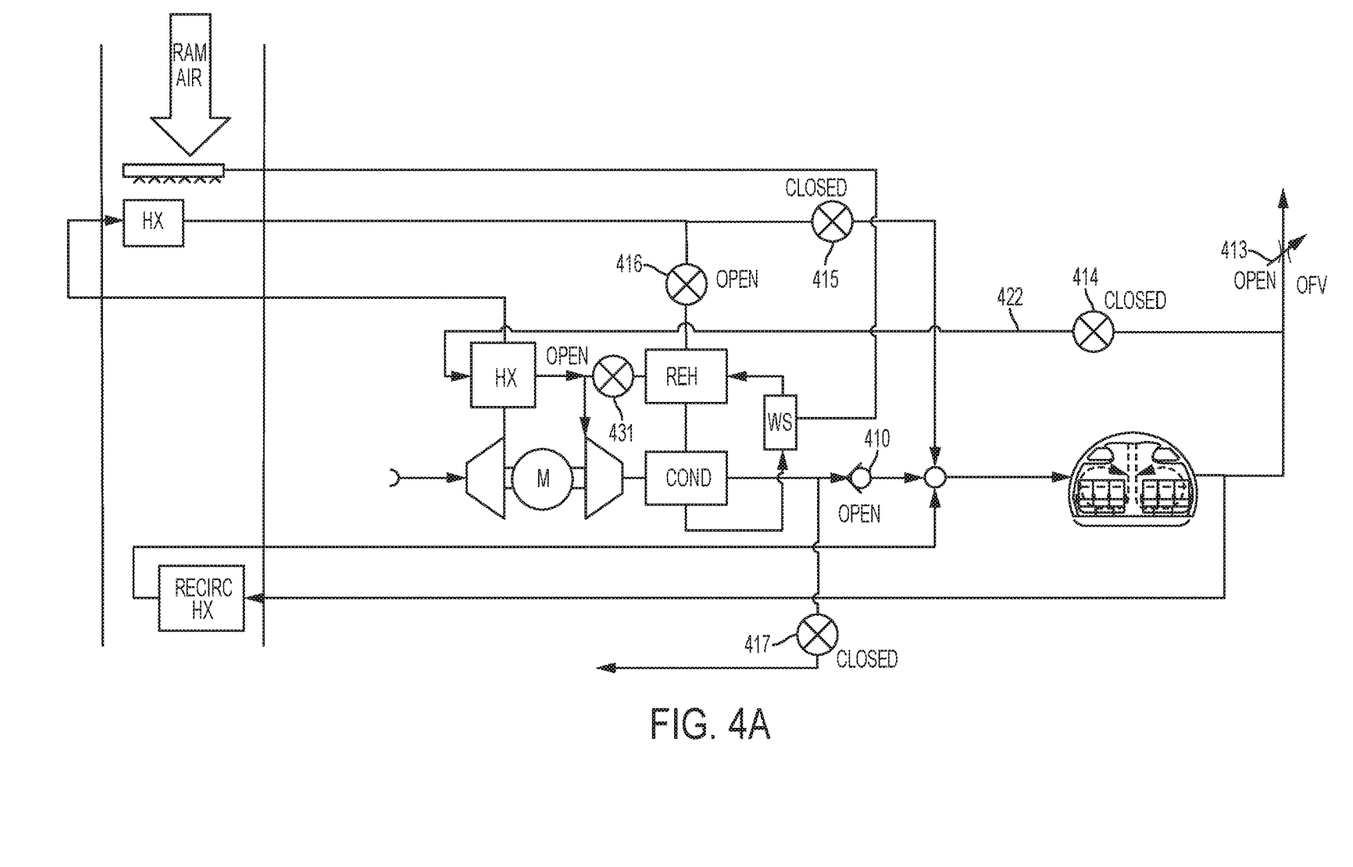
FIG. 4A is a schematic diagram of the environmental control system of in a first mode of operation.
Figure 4B:
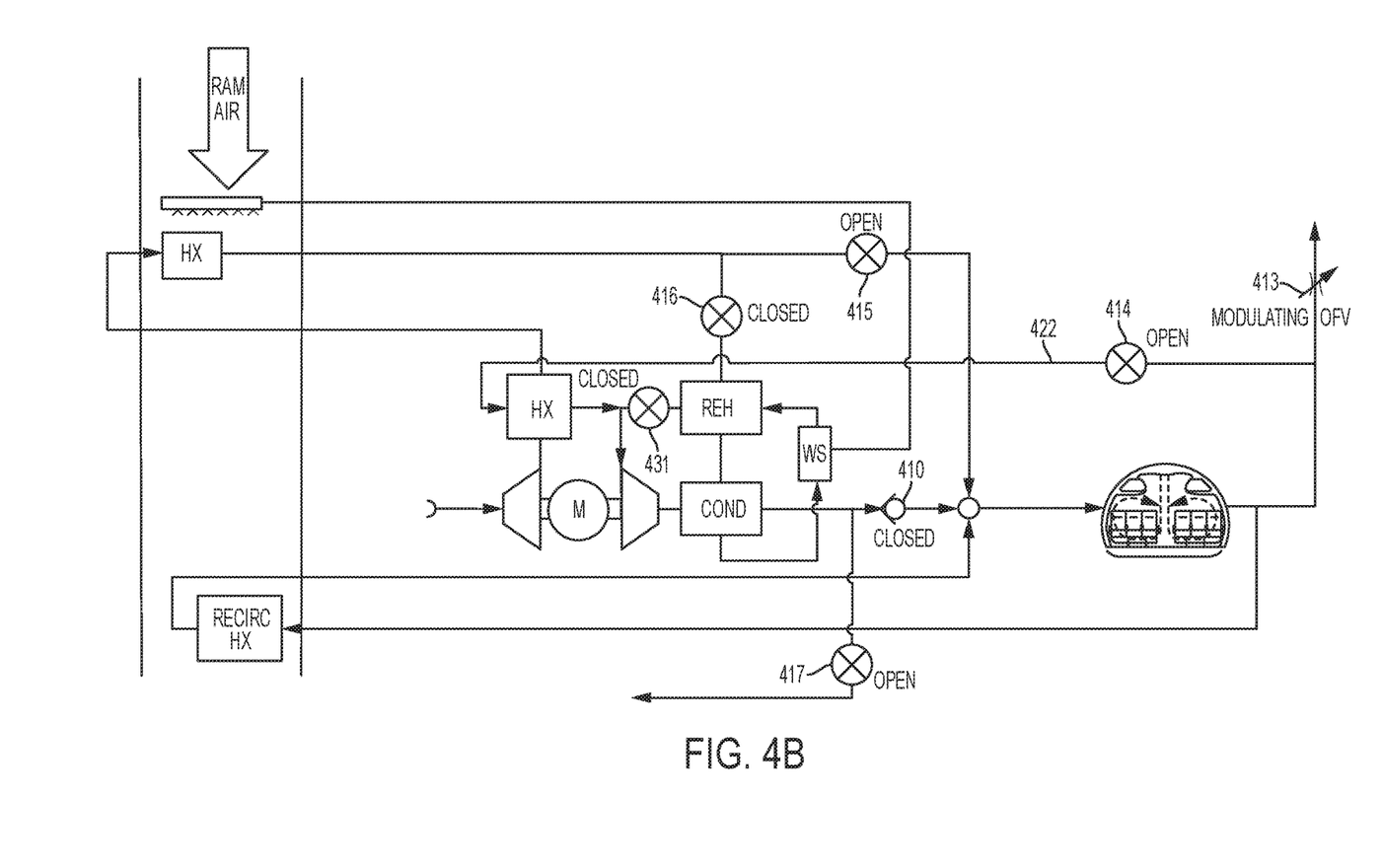
FIG. 4B is a schematic diagram of the environmental control system of in a second mode of operation.

FIGS. 4A-4B depict exemplary modes of operation of the ECS 400 that operate the same as the embodiments of FIG. 2B or 3B, except that the air in the flow path 422 bypasses the reheater-condenser loop in order to minimize the hydraulic losses.

FIG. 4A depicts an exemplary mode of operation of the ECS 400 when, for example, the ECS 400 is in an aircraft that is operating on the ground, in initial climb, or final descent. In an embodiment, the non-return valve 410 may be open, the outflow valve 413 may be open, the first valve 417 may be closed, the second valve 414 may be closed, the third valve 416 may be open, and the fourth valve 415 may be closed. In addition, the valve 431 may be open.

FIG. 4B depicts an exemplary mode of operation of the ECS 400 when, example, the ECS 400 is in an aircraft that is operating at a later stage of climb, cruising altitude, or at initial descent. In an embodiment, the non-return valve 410 may be closed, the outflow valve 413 may be modulating, the first valve 417 may be open, the second valve 414 may be open, the third valve 416 may be closed, and the fourth valve 415 may be open. In addition, the valve 431 may be closed.

EXAMPLES

In the embodiment of FIGS. 3B and 4B, the following electric power savings may be realized over the design of FIG. 1.

|  | Cold day | Normal day | Hot day |
| --- | --- | --- | --- |
| Climb/Descent | 15% | 18% | 18% |
| Cruise | 32% | 34% | 31% |

In the embodiment of FIG. 2B, the following electric power savings may be realized over the design of FIG. 1.

|  | Cold day | Normal day | Hot day |
| --- | --- | --- | --- |
| Climb/Descent | 13% | 17% | 15% |
| Cruise | 30% | 32% | 26% |

It should be understood, of course, that the foregoing relates to exemplary embodiments of the invention and that modifications may be made without departing from the spirit and scope of the invention as set forth in the following claims.

We claim:

1. An environmental control system (ECS), comprising:
an air cycle machine (ACM);
a condenser downstream of the ACM;
a reheater between the condenser and the ACM;
a primary heat exchanger upstream of the reheater;
a mixer downstream of the condenser, downstream of the primary heat exchanger, downstream of an environment to be conditioned, and upstream of the environment to be conditioned;
a recirculating heat exchanger downstream of the environment to be conditioned and downstream of the primary heat exchanger, wherein the recirculating heat exchanger receives outside air discharged from the primary heat exchanger;
a first regulated flow path from the condenser and to, via only a first valve, outside air that is not conditioned;
a second regulated flow path from the environment to be conditioned to, via only a second valve, the reheater;
a third regulated flow path from the primary heat exchanger and to, via only a third valve, the reheater; and
a fourth regulated flow path from the primary heat exchanger and to, via only a fourth valve, the mixer.

2. The ECS of claim 1, wherein the ACM is driven by an electric motor.

3. The ECS of claim 1, wherein the ACM includes two wheels.

4. The ECS of claim 1, further comprising a water extractor between the condenser and the reheater.

* * * * *